No. 728,431. PATENTED MAY 19, 1903.
A. C. AREY, JR.
CAM RACE PIN FOR COTTON COMBERS, &c.
APPLICATION FILED JAN. 15, 1902.

NO MODEL.

WITNESSES:

INVENTOR
Allen C. Arey Jr
BY
ATTORNEYS

No. 728,431. Patented May 19, 1903.

UNITED STATES PATENT OFFICE.

ALLEN C. AREY, JR., OF UTICA, NEW YORK, ASSIGNOR OF ONE-HALF TO LA FAYETTE HANNAS, OF UTICA, NEW YORK.

CAM-RACE PIN FOR COTTON-COMBERS, &c.

SPECIFICATION forming part of Letters Patent No. 728,431, dated May 19, 1903.

Application filed January 15, 1902. Serial No. 89,861. (No model.)

*To all whom it may concern:*

Be it known that I, ALLEN C. AREY, Jr., a citizen of the United States, and a resident of Utica, in the county of Oneida and State of New York, have invented a new and Improved Cam-Race Pin for Cotton-Combers and other Machines, of which the following is a full, clear, and exact description.

My invention relates to an improvement in cam-race pins, particularly adapted for use in connection with the quadrant-cams of cotton-combers, but which are also adaptable to the race of any cam.

The purpose of the invention is to so construct the cam-race pin that it will not be inclined to wear to any appreciable extent the center stud or wear the cam-race in which it travels no matter at what speed the cam may be driven.

Another purpose of the invention is to provide a simple and economic form of cam-race pin comprising an inner cup-sleeve adapted for attachment to the stud and an outer shell-section, between which two parts balls are loosely mounted and guided, and an adjustable cone for the shell-section.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
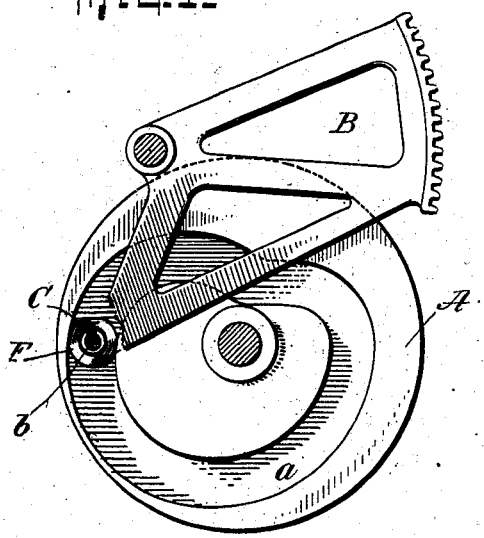
Figure 2:
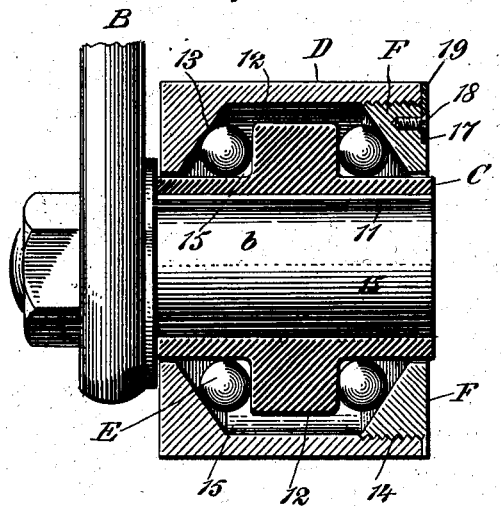
Figure 3:
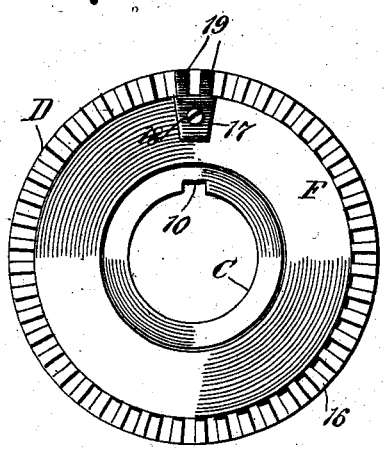
Figure 4:
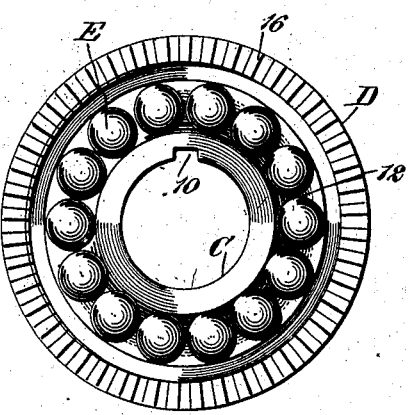

Figure 1 is a side elevation of the quadrant-cam of the cotton-comber and quadrant having the improved cam-race pin applied. Fig. 2 is a side elevation of a portion of the quadrant and attached stud and a central longitudinal section through the cam-race pin. Fig. 3 is an outer end view of the cam-race pin, and Fig. 4 is an outer end view of the device with the adjustable cone removed.

A represents a quadrant-cam such as is usually applied to cotton-combing machines, *a* the race of the cam, and B the quadrant working in connection with the cam, to which latter the improved cam-race pin is shown applied through the medium of a stud *b*, fast to the quadrant. The improved cam-race pin comprises what I term a "cup-sleeve" C; a shell D, which turns loosely on the sleeve; balls or rollers E, located within the shell and traveling on the sleeve; an adjustable cone F for the shell, and a locking device for the adjustable cone.

The cup-sleeve C is provided with a keyway 10, adapted to receive a feather 11 on the stud *b*, as is shown in Fig. 2, and at the exterior central portion of the sleeve a ring projection or circumferential rib 12 is formed. The shell D, which is cylindrical, turns loosely upon the sleeve, and its chamber is of such dimensions that the side wall of said chamber will not engage with the ring projection of the sleeve, as is also shown in Fig. 2. The inner end wall of the chamber of the shell is beveled, forming a fixed cone 13, while the outer end of the shell is open, and the wall of the shell-chamber at that point is provided with a thread 14.

The exteriorly-threaded centrally-apertured cone F is adapted to normally close the outer end of the sleeve C, and the balls or rollers E are placed in pockets 15, occurring between the ring projection 12 on the sleeve C and the fixed and adjustable cones 13 and F.

In operation it will be observed that the shell turns upon the balls or rollers, and the balls or rollers travel upon the sleeve, providing for the least possible amount of friction of the moving parts inside and out, and consequently but little wear is sustained by the cam-race pin and the cam-race in which the race-pin may travel.

The outer cone F is made adjustable to take up wear at any time, and means are provided for readily and effectually locking the adjustable cone in adjusted position. These means are best shown in Figs. 2 and 3 and consist of teeth 16, produced in the end of the shell D, and a plate 17, which may be of spring material attached to the outer face of the adjustable cone F and provided with prongs 19, which enter spaces between the teeth 16, as is particularly shown in Fig. 3.

Having thus described my invention, I claim as new and desire to secure by Letters Patent—

1. A cam-race pin, comprising a stud secured at one end to the part to be operated and provided with a key, a sleeve provided with a keyway to receive the key, of the stud, and with a central annular exterior projection, a shell mounted to turn on the sleeve, and having an open outer end and an inclined inner end wall forming a fixed cone, the open outer end being internally screw-threaded, an adjustable cone exteriorly threaded and having a central aperture to receive the sleeve, said cone screwing into the open end of the shell, a locking device for the adjustable cone, and balls between the projection of the sleeve and the cones of the shell, as set forth.

2. A cam-race pin, comprising a stud, a sleeve secured to the stud and provided with a central peripheral projection or rib, a shell mounted to turn on the sleeve, and having an open internally-screw-threaded outer end and an inclined inner end wall forming a fixed cone, the outer end of the shell being provided with teeth, a centrally-apertured and exteriorly-threaded cone fitting upon the sleeve and screwing into the open end of the shell, a plate secured to the last-named cone and engaging the teeth on the outer end of the shell, and balls between the projection or rib of the sleeve and the cones of the shell, as set forth.

In testimony whereof I have signed my name to this specification in the presence of two subscribing witnesses.

ALLEN C. AREY, JR.

Witnesses:
  HENRY M. LOVE,
  D. FRANCIS SEARLE.